United States Patent
Behera et al.

(10) Patent No.: US 11,669,413 B2
(45) Date of Patent: Jun. 6, 2023

(54) OBJECT METADATA MAINTENANCE PERTINENT TO OBJECT RESTORATION

(71) Applicant: EMC IP Holding Company LLC, Hopkinton, MA (US)

(72) Inventors: Amarendra Behera, Bangalore (IN); Sunil Yadav, Bangalore (IN); Shelesh Chopra, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/500,181

(22) Filed: Oct. 13, 2021

(65) Prior Publication Data

US 2023/0114368 A1 Apr. 13, 2023

(51) Int. Cl.
*G06F 11/10* (2006.01)
*G06F 11/14* (2006.01)

(52) U.S. Cl.
CPC ...... *G06F 11/1469* (2013.01); *G06F 11/1004* (2013.01); *G06F 2201/82* (2013.01)

(58) Field of Classification Search
CPC ............ G06F 11/1446; G06F 11/1458; G06F 11/1469; G06F 11/1004; G06F 2201/82; G06F 2201/83; G06F 2201/84
See application file for complete search history.

(56) References Cited

U.S. PATENT DOCUMENTS

| | | | | |
|---|---|---|---|---|
| 8,151,069 B1* | 4/2012 | Blitzer | ................ | G06F 11/1461 711/112 |
| 8,200,638 B1* | 6/2012 | Zheng | ................ | G06F 11/1469 707/681 |
| 8,504,529 B1* | 8/2013 | Zheng | ................ | G06F 11/1469 707/686 |
| 9,558,068 B1* | 1/2017 | Bono | ................ | G06F 11/1435 |
| 10,664,358 B1* | 5/2020 | Chen | ................ | G06F 3/0619 |
| 2006/0224636 A1* | 10/2006 | Kathuria | ............ | G06F 11/1471 |
| 2007/0006023 A1* | 1/2007 | Fujibayashi | ........ | G06F 11/1466 714/E11.12 |
| 2009/0077003 A1* | 3/2009 | Rai | ........................ | G06F 16/11 |
| 2016/0170844 A1* | 6/2016 | Long | ................ | G06F 11/1469 707/679 |
| 2018/0307562 A1* | 10/2018 | Xu | ....................... | G06F 11/1469 |
| 2019/0138386 A1* | 5/2019 | Konduru | ............ | G06F 11/1435 |

OTHER PUBLICATIONS

"Working with Headers and Footers" by Python-Docx historical version found via the WayBack Machine; archived Jun. 14, 2021 https://web.archive.org/web/20210614093152/https://python-docx.readthedocs.io/en/latest/user/hdrftr.html (Year: 2021).*

* cited by examiner

*Primary Examiner* — Joseph O Schell
(74) *Attorney, Agent, or Firm* — Chamberlain, Hrdlicka, White, Williams & Aughtry

(57) ABSTRACT

A method and system for object metadata maintenance pertinent to object restoration. Concerning the realm of data protection, metadata, descriptive of data, may be considered as critical, if not more, than the data being protected itself. Metadata, amongst other purposes, may facilitate the rapid and/or efficient restoration of the data. Like data, metadata may also be susceptible to corruption due to various reasons. With corrupted metadata, restoration of the data may prove challenging. Accordingly, the disclosed method and system propose a framework through which metadata, if corrupted partially or wholly, may be repaired or rebuilt, respectively, using the data itself as references.

18 Claims, 5 Drawing Sheets

OBJECT METADATA MAINTENANCE PERTINENT TO OBJECT RESTORATION

BACKGROUND

Metadata, amongst other purposes, may facilitate the rapid and/or efficient restoration of data. However, similar to data, metadata may also be susceptible to corruption due to various reasons. With corrupted metadata, restoration of the data may prove challenging.

SUMMARY

In general, in one aspect, the invention relates to a method for protecting objects. The method includes receiving a restore request comprising an object identifier (ID); in response to receiving the restore request: checking a data integrity of an object metadata store; making a determination, based on the checking, that the object metadata store has been corrupted; reconstructing, based on the determination, at least a portion of the object metadata store to produce a reconstructed object metadata store; identifying, within the reconstructed object metadata store, object metadata pertinent to the object ID; obtaining, from an object store, an object associated with the object ID; and restoring, to fulfill the restore request, the object using the object metadata.

In general, in one aspect, the invention relates to a non-transitory computer readable medium (CRM). The non-transitory CRM includes computer readable program code, which when executed by a computer processor, enables the computer processor to perform a method for protecting objects. The method includes receiving a restore request comprising an object identifier (ID); in response to receiving the restore request: checking a data integrity of an object metadata store; making a determination, based on the checking, that the object metadata store has been corrupted; reconstructing, based on the determination, at least a portion of the object metadata store to produce a reconstructed object metadata store; identifying, within the reconstructed object metadata store, object metadata pertinent to the object ID; obtaining, from an object store, an object associated with the object ID; and restoring, to fulfill the restore request, the object using the object metadata.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to object metadata maintenance pertinent to object restoration. Concerning the realm of data protection, metadata, descriptive of data, may be considered as critical, if not more, than the data being protected itself. Metadata, amongst other purposes, may facilitate the rapid and/or efficient restoration of the data. Like data, metadata may also be susceptible to corruption due to various reasons. With corrupted metadata, restoration of the data may prove challenging. Accordingly, the invention proposes a framework through which metadata, if corrupted partially or wholly, may be repaired or rebuilt, respectively, using the data itself as references.

Figure 1:
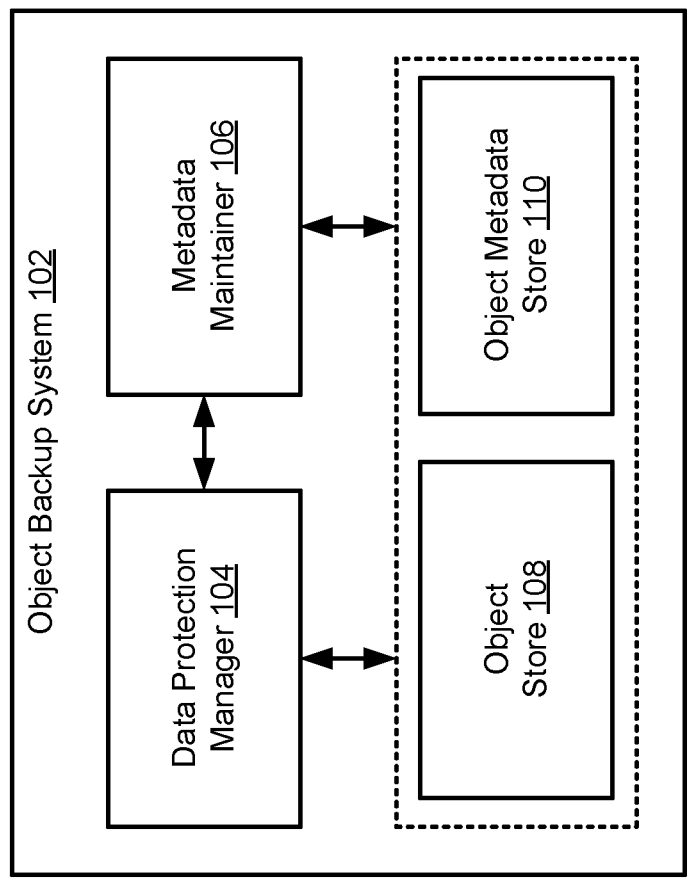
FIG. 1 shows a system in accordance with one or more embodiments of the invention.

FIG. 1 shows a system in accordance with one or more embodiments of the invention. The system (100) may include an object backup system (102), which is described below.

In one embodiment of the invention, the object backup system (102) may represent any data backup, archiving, and/or disaster recovery storage system. The object backup system (102) may be implemented using one or more network servers (not shown). Each network server may encompass a physical or a virtual network server, which may reside in an on-premises data center, a cloud computing environment, or a hybrid infrastructure thereof. Additionally, or alternatively, the object backup system (102) may be implemented using one or more computing systems similar to the exemplary computing system shown in FIG. 5.

In one embodiment of the invention, the object backup system (102) may facilitate object backup and restoration operations. To that extent, the object backup system (102) may include functionality to: receive, process, and complete backup requests targeting one or more objects (as illustrated and described in FIG. 3, below); and receive, process, and complete restore requests targeting one or more objects (as illustrated and described in FIG. 4, below). One of ordinary skill will appreciate that the object backup system (102) may perform other functionalities without departing from the scope of the invention.

Furthermore, the object backup system (102) may include a data protection manager (104), a metadata maintainer (106), an object store (108), and an object metadata store (110). Each of these object backup system (102) subcomponents is described below.

In one embodiment of the invention, the data protection manager (104) may refer to a computer program that may execute on the underlying hardware of the object backup system (102). The data protection manager (104) may be responsible for the management of backup and restoration operations entailing one or more objects (not shown). An object may refer to a uniquely identifiable, unstructured yet self-describing unit of data. Objects are described in further detail in FIG. 2, below. To the extent of the aforementioned responsibilities, the data protection manager (104) may include functionality to: receive backup requests including one or more objects; store the received object(s) in the object store (108) to obtain object metadata; update the object metadata store (110) using the obtained object metadata; receive restore requests including one or more object identifiers (IDs); retrieve object(s) associated with the received object ID(s) from the object store (108); identify object metadata retained on the object metadata store (110), which may be pertinent to the retrieved object(s); and restore the retrieved object(s) using the identified object metadata. One of ordinary skill, however, will appreciate that the data protection manager (104) may perform other functionalities without departing from the scope of the invention.

In one embodiment of the invention, the metadata maintainer (106) may refer to a computer program that may execute on the underlying hardware of the object backup store (102). The metadata maintainer (106) may be responsible for checking the integrity of the object metadata store (110) and repairing or rebuilding the object metadata store (110) should it be corrupted partially or wholly, respectively. To that extent, the metadata maintainer (106) may include functionality to: calculate or re-calculate an object metadata checksum of the object metadata store (110) each time the object metadata store (110) may be updated by the data protection manager (104); retain the calculated object metadata checksum securely as a stored object metadata checksum; calculate or re-calculate another object metadata checksum of the object metadata store (110) periodically or on-demand (e.g., upon receipt of a restore request by the data protection manager (104); compare the calculated other object metadata checksum against the stored object metadata checksum to ascertain whether the object metadata store (110) is corrupted; should the object metadata store (110) be corrupted, ascertain whether the corruption is partial or whole; and refer to a subset or all of the objects in the object store (108) to repair or rebuild the object metadata store (110) based on whether the object metadata store (110) is partially corrupted or wholly corrupted, respectively. One of ordinary skill, however, will appreciate that the metadata maintainer (106) may perform other functionalities without departing from the scope of the invention.

In one embodiment of the invention, the object store (108) may refer to physical storage (or logical storage occupying at least a portion of the physical storage) on the object backup system (102), where any number of objects (described below) (see e.g., FIG. 2) may be consolidated and indexed. The object store (108) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Further, the object store (108) may be accessed by the data protection manager (104) and the metadata maintainer (106), however, may only be updated or modified by the former.

In one embodiment of the invention, the object metadata store (110) may refer to physical storage (or logical storage occupying at least a portion of the physical storage) on the object backup system (102), where object relational metadata descriptive of any object relationships, as well as backup operation metadata descriptive of the backup operation(s) attempted and/or completed by the data protection manager (104), may be consolidated and indexed. The object metadata store (110) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Further, the object metadata store may be accessed and modified by the data protection manager (104) as well as the metadata maintainer (106).

While FIG. 1 shows a configuration of components, other system (100) configurations may be used without departing from the scope of the invention. For example, in one embodiment of the invention, the metadata maintainer (106) may reside and operate outside, yet remain operatively connected to, the object backup system (102). In such an embodiment, the metadata maintainer (106) may be implemented using one or more network servers (not shown), where each network server may encompass a physical or virtual network server that may reside in an on-premises data center, a cloud computing environment, or a hybrid infrastructure thereof. Additionally, or alternatively, the metadata maintainer (106), in such an embodiment, may be implemented using one or more computing systems similar to the exemplary computing system shown in FIG. 5.

By way of another example, in another embodiment of the invention, the system (100) may further include one or more host devices (not shown), which may each operatively connect to the object backup system (102). In such an embodiment, each host device may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, each host device may include and allocate various resources (e.g., computer processors, memory, storage, virtualization, network bandwidth, etc.), as needed, to the computer programs and the tasks (or processes) instantiated thereby. One of ordinary skill will appreciate that each host device may perform other functionalities without departing from the scope of the invention. Examples of a host device may include, but are not limited to, a desktop computer, a laptop computer, a network server, or any other computing system similar to the exemplary computing system shown in FIG. 5.

Figure 2:
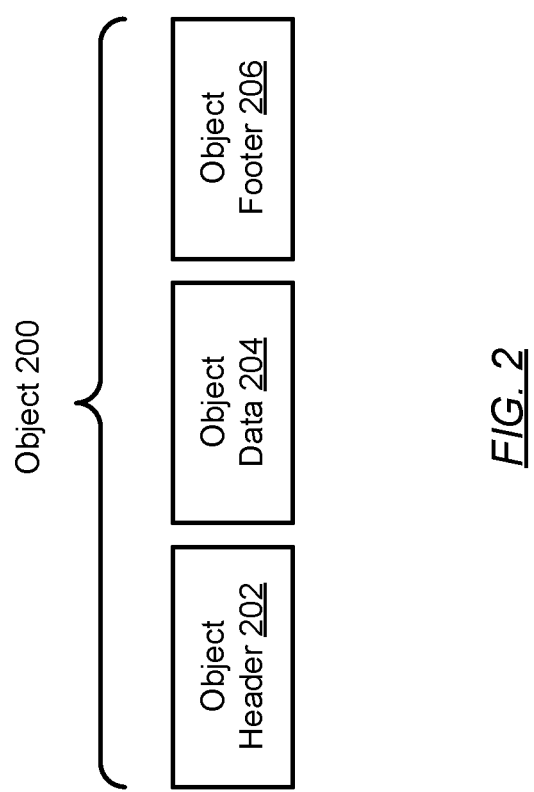
FIG. 2 shows an object in accordance with one or more embodiments of the invention.

FIG. 2 shows an object in accordance with one or more embodiments of the invention. An object (200) may refer to a uniquely identifiable, unstructured yet self-describing unit of data. To that extent, an object (200) may include an object header (202), object data (204), and an object footer (206). Each of these object (200) subcomponents is described below.

In one embodiment of the invention, the object header (202) may refer to a collection of supplemental information, or metadata, descriptive of the object (200) and/or object data (204) (described below). Examples of metadata forming the object header (202) may include, but are not limited to, an object identifier (ID) uniquely identifying the object (200); a parent object ID (if any) uniquely identifying a parent object (not shown) of the object (200); an object data name associated with the object data (204); an object data length (e.g., measured in bytes) indicating a quantity of storage space consumed by the object data (204); and one or more object attributes pertinent to the object (200) and/or object data (204). The object header (202) may include additional or alternative metadata without departing from the scope of the invention.

In one embodiment of the invention, the object data (204) may encompass any size and/or form of unstructured data that is sought to be protected against data loss events. Examples of said unstructured data may include, but are not limited to, video, audio, images, email, web pages, large sensor datasets, database files, online collaboration files, log files, archival files, or any combination thereof.

In one embodiment of the invention, the object footer (206) may refer to a collection of supplemental information, or metadata, descriptive of the object (200) and/or object data (204). Examples of metadata forming the object footer (206) may include, but are not limited to, an error checking protocol—e.g., a cyclic redundancy check (CRC) or checksum—which may be used to ascertain the data integrity of the object (200) and/or object data (204). The object footer (206) may include additional or alternative metadata without departing from the scope of the invention.

While FIG. 2 shows a configuration of subcomponents, other object (200) configurations may be used without departing from the scope of the invention.

Figure 3:
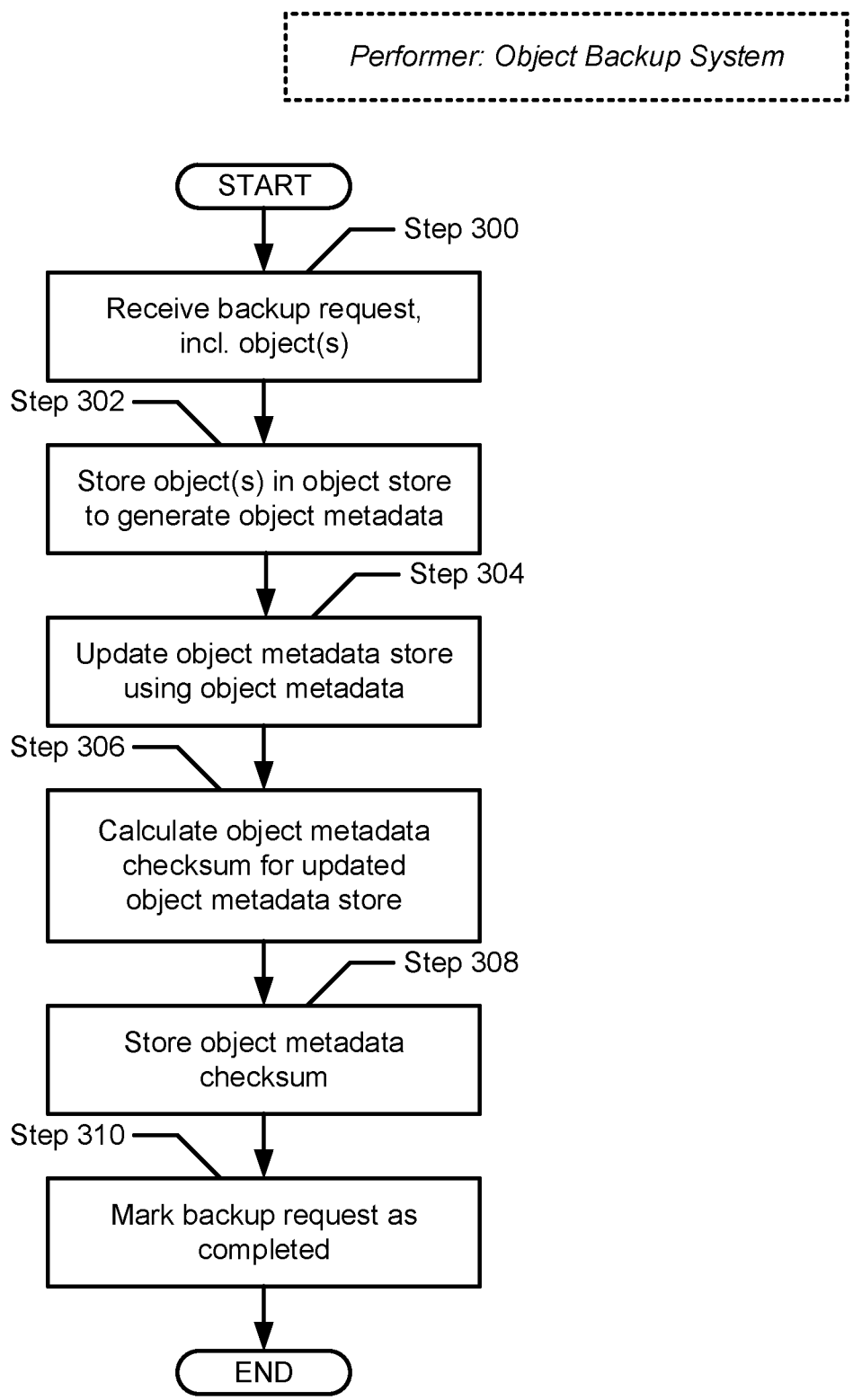
FIG. 3 shows a flowchart describing a method for completing a backup request in accordance with one or more embodiments of the invention.

FIG. 3 shows a flowchart describing a method for completing a backup request in accordance with one or more embodiments of the invention. The various steps outlined below may be performed by the object backup system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a backup request is received. In one embodiment of the invention, the backup request may pertain to performing a backup operation. Further, the backup request may include one or more objects (described above) (see e.g., FIG. 2) that may include data sought to be protected against data loss events.

In Step 302, in fulfilling the backup operation, at least in part, the object(s) (received in Step 300) is/are stored in the object store on the object backup system (see e.g., FIG. 1). In one embodiment of the invention, during, and/or as a result of, the backup operation, object metadata, pertinent to the object(s), may be generated or otherwise obtained. The aforementioned object metadata may include, but is not limited to, backup operation metadata descriptive of the backup operation, and object relational metadata descriptive of any object relationships. Backup operation metadata may, for example, include: a backup operation identifier (ID) assigned to the backup operation; a backup type—e.g., full, incremental, or differential —associated with the backup operation; a backup timestamp encoding the date and/or time the backup operation commenced; the object ID(s) associated with the object(s) involved in the backup operation; a list of restore points (e.g., backup operations) along the backup operation chain; and restore point connection information detailing how the restore points may be linked to one another. Meanwhile, object relational metadata may, for example, include: any parent-child relationships amongst the object(s); and any one-to-many relationships amongst the object(s). One of ordinary skill will appreciate that the object metadata may include additional or alternative information without departing from the scope of the invention.

In Step 304, the object metadata store (see e.g., FIG. 1) is updated to include the object metadata (generated/obtained in Step 302).

Thereafter, in Step 306, an object metadata checksum is calculated. That is, in one embodiment of the invention, a cryptographic hash function may be applied to the content of the object metadata store (updated in Step 304) in order to produce a hash value representative of the object metadata checksum. Further, calculating the object metadata checksum may entail using any existing cryptographic hash algorithm—examples of which may include, but is not limited to, the message-digest 5 (MD5) algorithm, and the secure hash 256 (SHA-256) algorithm. Further, the object metadata checksum may serve to verify the data integrity of the object metadata store.

In Step 308, the object metadata checksum (calculated in Step 306) is stored. In one embodiment of the invention, the object metadata checksum may be retained on secure computer memory accessible to the metadata maintainer (see e.g., FIG. 1) on the object backup system.

In Step 310, the backup request, and thus the backup operation, is marked as completed.

Figure 4:
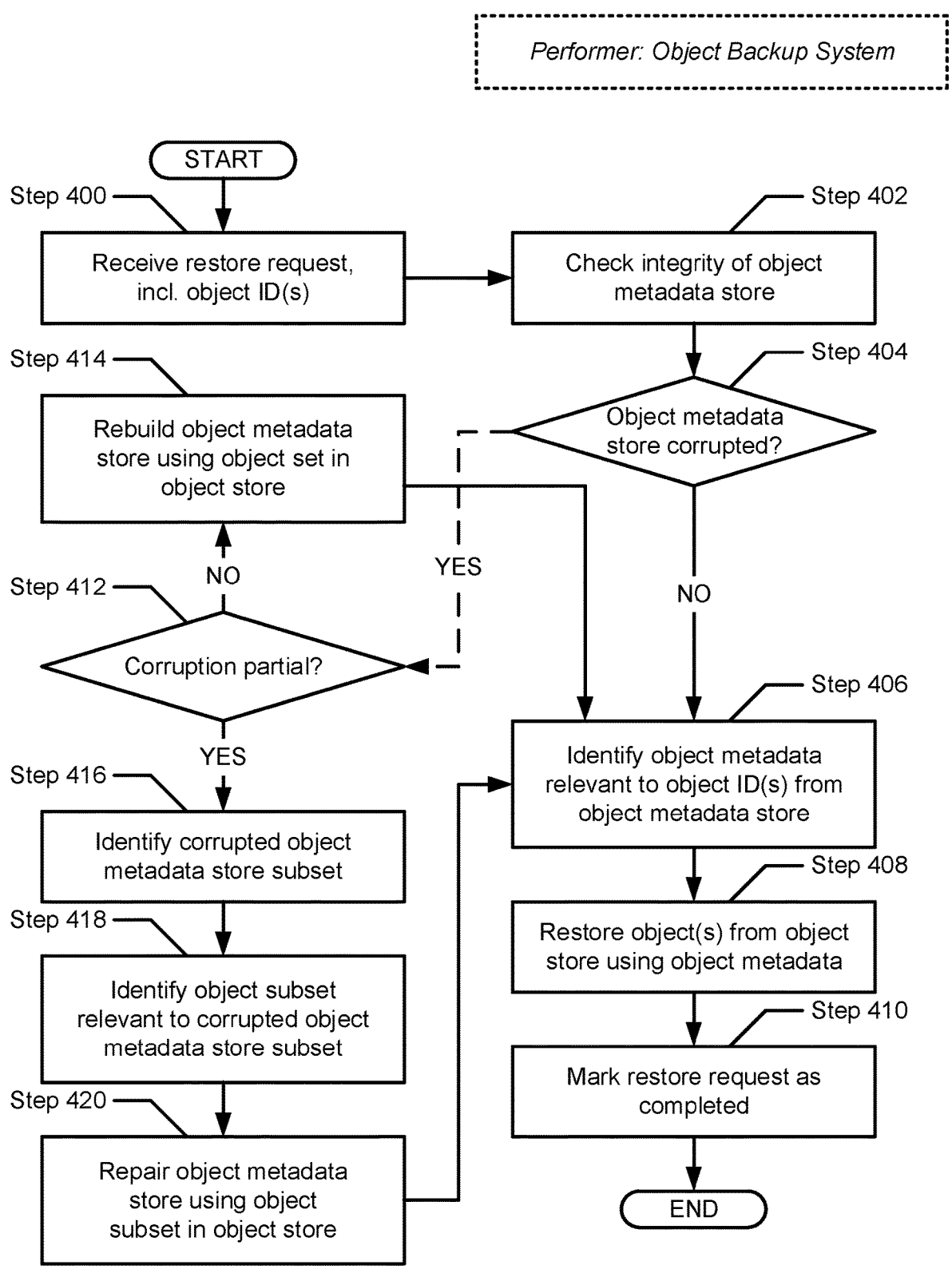
FIG. 4 shows a flowchart describing a method for completing a restore request in accordance with one or more embodiments of the invention.

FIG. 4 shows a flowchart describing a method for completing a restore request in accordance with one or more embodiments of the invention. The various steps outlined below may be performed by the object backup system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a restore request is received. In one embodiment of the invention, the restore request may pertain to the sought recovery or restoration of one or more objects following a data loss event. To that extent, the restore request may include one or more object identifiers (IDs).

In Step 402, a data integrity of the object metadata store (see e.g., FIG. 1) is checked. In one embodiment of the invention, verifying the data integrity of the object metadata store may entail: calculating a current object metadata checksum via the application of a cryptographic hash function on the current content of the object metadata store; and comparing the current object metadata checksum against a previously stored object metadata checksum (generated after a last time the object metadata store had been received authorized updates or modifications—e.g., following a backup operation (see e.g., FIG. 3)).

In one embodiment of the invention, the object metadata store may be susceptible or vulnerable to data corruption at any point-in-time between calculations of the object metadata checksums. By way of examples, the cause(s) of said data corruption exposed to the object metadata store may include, but is/are not limited to: the crashing of any previous backup operations entailing the object backup system; collateral corruption due to network related issues; third-party operations, such as cyber recovery, etc.; third-party applications and/or workflows which may leverage the object metadata store; and physical and/or logical damage to at least a portion of the storage resources implementing the object metadata store.

In Step 404, a determination is made as to whether the object metadata store is corrupted. Accordingly, in one embodiment of the invention, if it is determined that the above-mentioned current object metadata checksum matches the previously stored object metadata checksum, then the data integrity of the object metadata store is intact (i.e., not corrupted) and the method proceeds to Step 406. On the other hand, in another embodiment of the invention, if it is alternatively determined that the above-mentioned current object metadata checksum mismatches the previously stored object metadata checksum, then the data integrity of the object metadata store is compromised (i.e., corrupted) and the method alternatively proceeds to Step 412.

In Step 406, following the determination (in Step 404) that the object metadata store is not corrupted, following the reconstruction of the object metadata store (performed in Step 414) (described below), or following the repair of the object metadata store (performed in Step 420) (described below), object metadata, maintained on the object metadata store, is identified. In one embodiment of the invention, the identified object metadata may be associated with the object ID(s) (received in Step 400). As a reiteration of the above, object metadata may include, but is not limited to, backup operation metadata descriptive of the backup operation, and object relational metadata descriptive of any object relationships. Backup operation metadata may, for example, include: a backup operation identifier (ID) assigned to the backup operation; a backup type—e.g., full, incremental, or differential—associated with the backup operation; a backup timestamp encoding the date and/or time the backup operation commenced; the object ID(s) associated with the object(s) involved in the backup operation; a list of restore points (e.g., backup operations) along the backup operation chain; and restore point connection information detailing how the restore points may be linked to one another. Meanwhile, object relational metadata may, for example, include: any parent-child relationships amongst the object(s); and any one-to-many relationships amongst the object(s). One of ordinary skill will appreciate that the object metadata may include additional or alternative information without departing from the scope of the invention.

In Step 408, one or more objects is/are retrieved from the object store (see e.g., FIG. 1) and subsequently restored. In one embodiment of the invention, the retrieved/restored object(s) may be associated, respectively, with the object ID(s) (identified in Step 406).

Thereafter, in Step 410, the restore request is marked as completed.

In Step 412, following the alternative determination (in Step 404) that the object metadata store is corrupted, another determination is made as to whether the data corruption is partial. This determination may entail the examination of a corruption history maintained for the object metadata store. The corruption history may refer to a data structure or a data file that may log or record instance(s) when damaged or unreadable region(s) of the object metadata store is/are discovered. Discovery of these regions may result from scans directed to the object metadata store, which may be performed during and/or periodically following any backup and/or recovery/restoration operations. Further, whether the object metadata store is corrupted partially or wholly may be depend on the storage space consumed by the damaged/unreadable region(s) in relation to a predefined threshold (e.g., 70%) of the total object metadata store size.

Accordingly, in one embodiment of the invention, if it is determined that the recorded data corruption in the object metadata store meets or exceeds the predefined threshold or percentage of the total object metadata store size, then the object metadata store may be substantially or wholly (rather than partially) corrupted and the method proceeds to Step 414. On the other hand, in another embodiment of the invention, if it is alternatively determined that the recorded data corruption in the object metadata store falls short of the predefined threshold or percentage of the total object metadata store size, then the object metadata store may be partially (rather than substantially/wholly) corrupted and the method alternatively proceeds to Step 416.

In Step 414, following the determination (in Step 412) that the object metadata store is substantially or wholly corrupted, the object metadata store is rebuilt. In one embodiment of the invention, rebuilding of the object metadata store may entail: accessing the entirety of the object store (see e.g., FIG. 1) and thus the stored object set therein; extracting the metadata specified in the object header (see e.g., FIG. 2) of each object of the object set; and inferring backup operation metadata, as well as object relational metadata, from the extracted object header metadata to reconstruct the object metadata store. Further, following the rebuilding of the object metadata store, the method proceeds to Step 406 (described above).

In Step 416, following the alternative determination (in Step 412) that the object metadata store is partially corrupted, a corrupted object metadata store subset is identified. In one embodiment of the invention, the corrupted object metadata store subset may highlight one or more portions of object metadata store content plagued by data corruption. Further, the aforementioned corrupted portion(s) of the object metadata store may be identified through comparison of a checksum relating to each object metadata record in the object metadata store against a stored checksum for the object metadata record retained as part of the object header of an object corresponding to the object metadata record. Should the former checksum mismatch the latter checksum, or if either or both checksum is/are absent, then the object metadata record may be considered a corrupted portion of the object metadata store.

In Step 418, an object subset, of the object set maintained in the object store, is identified. In one embodiment of the invention, the object set may include one or more objects with relevance to the corrupted object metadata store subset (identified in Step 416).

In Step 420, the object metadata store is repaired. In one embodiment of the invention, repairing of the object metadata store may entail: accessing the object subset (identified in Step 418) maintained in the object store; extracting the metadata specified in the object header (see e.g., FIG. 2) of each object of the object subset; and inferring backup operation metadata, as well as object relational metadata, from the extracted object header metadata to repair the corrupted object metadata store subset (identified in Step 416). Further, following the repair of the object metadata store, the method proceeds to Step 406 (described above).

Figure 5:
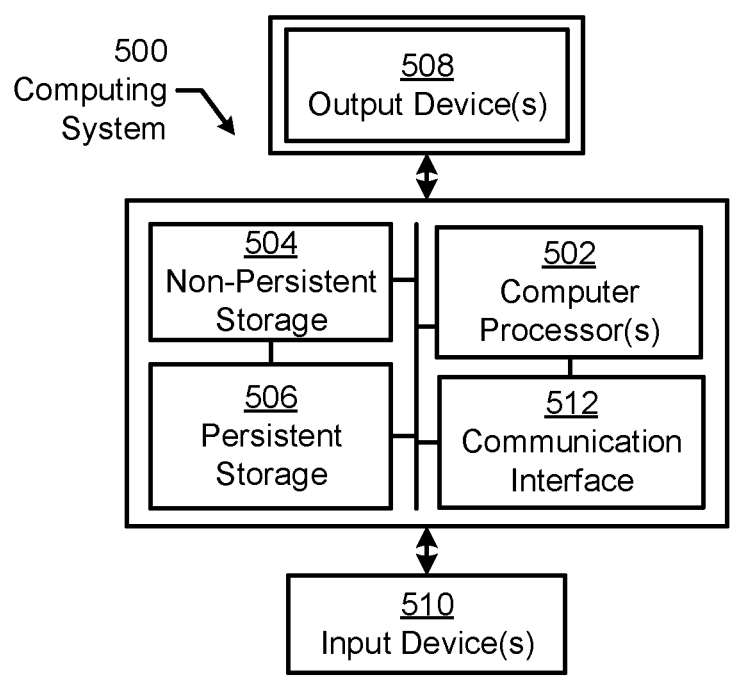
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (304), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for protecting objects, the method comprising:
    receiving a restore request comprising an object identifier (ID);
    in response to receiving the restore request:
        checking a data integrity of an object metadata store;
        making a determination, based on the checking, that the object metadata store has been corrupted;
        reconstructing, based on the determination, at least a portion of the object metadata store to produce a reconstructed object metadata store;
        identifying, within the reconstructed object metadata store, object metadata pertinent to the object ID, wherein the object metadata comprises backup operation metadata and object relational metadata;
        obtaining, from an object store, an object associated with the object ID; and
        restoring, to fulfill the restore request, the object using the object metadata.

2. The method of claim 1, wherein checking the data integrity of the object metadata store comprises:
    calculating a current object metadata checksum for content maintained in the object metadata store; and
    comparing the current object metadata checksum against a stored object metadata checksum previously calculated for the content maintained in the object metadata store.

3. The method of claim 1, the method further comprising:
    prior to reconstructing the at least portion of the object metadata store:
        making a second determination that the object metadata store is partially corrupted;
        based on the second determination:
            identifying a corrupted object metadata store subset of the object metadata store; and
            identifying an object set comprising a subset of all objects maintained in the object store,
        wherein reconstruction of the at least portion of the object metadata store comprises repairing the corrupted object metadata store subset based on the object set.

4. The method of claim 3, wherein the subset of all objects comprises at least one object relevant to the corrupted object metadata store subset.

5. The method of claim 3, wherein repairing the corrupted metadata store subset based on the object set comprises using object header information belonging to each object in the object set.

6. The method of claim 1, the method further comprising:
    prior to reconstructing the at least a portion of the object metadata store:
        making a second determination that the object metadata store is wholly corrupted; and
        identifying, based on the second determination, an object set comprising all objects maintained in the object store,
        wherein reconstruction of the at least a portion of the object metadata store comprises rebuilding an entirety of the object metadata store based on the object set.

7. The method of claim 1, wherein the object comprises an object header, object data, and an object footer.

8. The method of claim 1, the method further comprising:
    prior to receiving the restore request:
        receiving a backup request comprising the object;
        storing, to fulfill the backup request and to obtain the object metadata, the object within the object store;
        updating the object metadata store using the object metadata;
        calculating, after updating the object metadata store, a current object metadata checksum for content maintained in the object metadata store; and
        obtaining a stored object metadata checksum by storing the current object metadata checksum.

9. The method of claim 1, the method further comprising:
    after fulfilling the restore request:
        receiving a second restore request comprising a second object ID;

in response to receiving the second restore request:
  checking the data integrity of the reconstructed object metadata store;
  making a second determination, based on the checking, that the reconstructed object metadata store has not been corrupted;
  identifying, based on the second determination and within the reconstructed object metadata store, second object metadata pertinent to the second object ID;
  obtaining, from the object store, a second object associated with the second object ID; and
  restoring, to fulfill the second restore request, the second object using the second object metadata.

10. A non-transitory computer readable medium (CRM) comprising computer readable program code, which when executed by a computer processor, enables the computer processor to perform a method for protecting objects, the method comprising:
  receiving a restore request comprising an object identifier (ID);
  in response to receiving the restore request:
    checking a data integrity of an object metadata store;
    making a determination, based on the checking, that the object metadata store has been corrupted;
    reconstructing, based on the determination, at least a portion of the object metadata store to produce a reconstructed object metadata store;
    identifying, within the reconstructed object metadata store, object metadata pertinent to the object ID, wherein the object metadata comprises backup operation metadata and object relational metadata;
    obtaining, from an object store, an object associated with the object ID; and
    restoring, to fulfill the restore request, the object using the object metadata.

11. The non-transitory CRM of claim 10, wherein checking the data integrity of the object metadata store comprises:
  calculating a current object metadata checksum for content maintained in the object metadata store; and
  comparing the current object metadata checksum against a stored object metadata checksum previously calculated for the content maintained in the object metadata store.

12. The non-transitory CRM of claim 10, the method further comprising:
  prior to reconstructing the at least portion of the object metadata store:
    making a second determination that the object metadata store is partially corrupted;
    based on the second determination:
      identifying a corrupted object metadata store subset of the object metadata store; and
      identifying an object set comprising a subset of all objects maintained in the object store,
      wherein reconstruction of the at least portion of the object metadata store comprises repairing the corrupted object metadata store subset based on the object set.

13. The non-transitory CRM of claim 12, wherein the subset of all objects comprises at least one object relevant to the corrupted object metadata store subset.

14. The non-transitory CRM of claim 12, wherein repairing the corrupted metadata store subset based on the object set comprises using object header information belonging to each object in the object set.

15. The non-transitory CRM of claim 10, the method further comprising:
  prior to reconstructing the at least a portion of the object metadata store:
    making a second determination that the object metadata store is wholly corrupted; and
    identifying, based on the second determination, an object set comprising all objects maintained in the object store,
    wherein reconstruction of the at least a portion of the object metadata store comprises rebuilding an entirety of the object metadata store based on the object set.

16. The non-transitory CRM of claim 10, wherein the object comprises an object header, object data, and an object footer.

17. The non-transitory CRM of claim 10, the method further comprising:
  prior to receiving the restore request:
    receiving a backup request comprising the object;
    storing, to fulfill the backup request and to obtain the object metadata, the object within the object store;
    updating the object metadata store using the object metadata;
    calculating, after updating the object metadata store, a current object metadata checksum for content maintained in the object metadata store; and
    obtaining a stored object metadata checksum by storing the current object metadata checksum.

18. The non-transitory CRM of claim 10, the method further comprising:
  after fulfilling the restore request:
    receiving a second restore request comprising a second object ID;
    in response to receiving the second restore request:
      checking the data integrity of the reconstructed object metadata store;
      making a second determination, based on the checking, that the reconstructed object metadata store has not been corrupted;
      identifying, based on the second determination and within the reconstructed object metadata store, second object metadata pertinent to the second object ID;
      obtaining, from the object store, a second object associated with the second object ID; and
      restoring, to fulfill the second restore request, the second object using the second object metadata.

* * * * *